United States Patent
Lam

(10) Patent No.: US 9,274,629 B2
(45) Date of Patent: *Mar. 1, 2016

(54) TWO-WAY TOUCH-SCREEN BASED COMMUNICATION SYSTEM

(71) Applicant: THE USUAL, INC, San Francisco, CA (US)

(72) Inventor: Andy Lam, San Francisco, CA (US)

(73) Assignee: THE USUAL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,002

(22) Filed: Jan. 30, 2014

(65) Prior Publication Data

US 2014/0149261 A1 May 29, 2014

Related U.S. Application Data

(63) Continuation of application No. 13/866,038, filed on Apr. 19, 2013, now Pat. No. 8,743,073, which is a continuation of application No. 13/078,946, filed on Apr. 2, 2011, now Pat. No. 8,436,826.

(60) Provisional application No. 61/320,527, filed on Apr. 2, 2010.

(51) Int. Cl.
*G06F 3/041* (2006.01)
*G06Q 30/02* (2012.01)
(Continued)

(52) U.S. Cl.
CPC .............. *G06F 3/041* (2013.01); *G06Q 30/02* (2013.01); *G06Q 30/0207* (2013.01);
(Continued)

(58) Field of Classification Search
CPC ...... G06F 3/0488; G06F 3/1423; G06Q 20/20; G06Q 30/02; G06Q 30/0281; G06Q 30/06; G06Q 30/0633
See application file for complete search history.

(56) References Cited

U.S. PATENT DOCUMENTS 5,128,862 A 7/1992 Mueller
5,235,509 A 8/1993 Mueller et al.
(Continued)

FOREIGN PATENT DOCUMENTS

WO 0135716 A2 5/2001
WO 03067369 A2 8/2003
(Continued)

OTHER PUBLICATIONS

Supplementary European Search Report, European Patent Application No. EP 11863122, Sep. 4, 2014.
(Continued)

*Primary Examiner* — Joe H Cheng
(74) *Attorney, Agent, or Firm* — SU IP Consulting

(57) ABSTRACT

Embodiments of the disclosure generally set forth a two-way touch screen based communication system. One example method may include receiving an order for an item from a first touch screen device via a first network, wherein the order is associated with a first identification for a merchant, a second identification for the customer, and a negotiable parameter reflective of a preference of the customer. The method may also include making available the order for a second touch screen device of the merchant to retrieve via a second network and to display and prior to completing processing of the order, transmitting a first response to the preference of the customer to the first touch screen device via the first network.

82 Claims, 4 Drawing Sheets

(51) Int. Cl.
  *G06Q 50/12* (2012.01)
  *G06Q 30/06* (2012.01)
  *G06F 3/0488* (2013.01)

(52) U.S. Cl.
  CPC ....... *G06Q 30/0226* (2013.01); *G06Q 30/0281* (2013.01); *G06Q 30/0633* (2013.01); *G06Q 50/12* (2013.01); *G06F 3/0488* (2013.01)

(56) References Cited

U.S. PATENT DOCUMENTS

| | | | |
|---|---|---|---|
| 5,991,739 | A | 11/1999 | Cupps et al. |
| 6,055,573 | A * | 4/2000 | Gardenswartz et al. ...... 709/224 |
| 6,292,786 | B1 * | 9/2001 | Deaton et al. .............. 705/14.25 |
| 6,323,894 | B1 | 11/2001 | Katz |
| 6,611,811 | B1 | 8/2003 | Deaton et al. |
| 7,174,308 | B2 | 2/2007 | Bergman et al. |
| 7,302,403 | B1 | 11/2007 | Landau et al. |
| 7,343,174 | B2 | 3/2008 | Suryanarayana et al. |
| 7,568,618 | B1 | 8/2009 | Scutellaro et al. |
| 7,724,716 | B2 | 5/2010 | Fadell |
| 7,762,181 | B2 | 7/2010 | Boland et al. |
| 7,818,191 | B2 | 10/2010 | Lutnick et al. |
| 7,974,873 | B2 | 7/2011 | Simmons et al. |
| 8,190,483 | B2 | 5/2012 | Woycik et al. |
| 8,200,550 | B2 | 6/2012 | Aitkins |
| 8,436,826 | B2 | 5/2013 | Lam |
| 2001/0047302 | A1 | 11/2001 | Yoshinaga et al. |
| 2001/0049636 | A1 | 12/2001 | Hudda et al. |
| 2002/0133418 | A1 | 9/2002 | Hammond et al. |
| 2002/0138350 | A1 | 9/2002 | Cogen |
| 2002/0147647 | A1 | 10/2002 | Ragsdale-Elliott et al. |
| 2003/0046166 | A1 | 3/2003 | Liebman |
| 2003/0078793 | A1 | 4/2003 | Toth |
| 2003/0208409 | A1 | 11/2003 | Mault |
| 2004/0015403 | A1 | 1/2004 | Moskowitz et al. |
| 2004/0015414 | A1 | 1/2004 | Sidlo et al. |
| 2004/0054592 | A1 | 3/2004 | Hernblad |
| 2004/0143503 | A1 | 7/2004 | Suthar |
| 2004/0158499 | A1 | 8/2004 | Dev et al. |
| 2004/0214597 | A1 | 10/2004 | Suryanarayana et al. |
| 2005/0015301 | A1 | 1/2005 | Johnson |
| 2005/0059414 | A1 | 3/2005 | Mahmoodi et al. |
| 2005/0182681 | A1 | 8/2005 | Bruskotter et al. |
| 2005/0273345 | A1 | 12/2005 | Castillejo Romero |
| 2006/0196935 | A1 | 9/2006 | Muto |
| 2006/0218040 | A1 | 9/2006 | Sabapathypillai |
| 2007/0088624 | A1 | 4/2007 | Vaughn et al. |
| 2007/0203807 | A1 | 8/2007 | DeAngelis |
| 2007/0239565 | A1 | 10/2007 | Pentel |
| 2008/0128497 | A1 | 6/2008 | Teraoka et al. |
| 2008/0183593 | A1 | 7/2008 | Dierks |
| 2008/0195621 | A1 | 8/2008 | Tedesco et al. |
| 2009/0076920 | A1 | 3/2009 | Feldman et al. |
| 2009/0089183 | A1 | 4/2009 | Afram et al. |
| 2009/0132379 | A1 | 5/2009 | Baril et al. |
| 2009/0167553 | A1 | 7/2009 | Hong et al. |
| 2009/0259553 | A1 | 10/2009 | Carroll et al. |
| 2009/0265247 | A1 | 10/2009 | Carroll et al. |
| 2009/0281903 | A1 | 11/2009 | Blatstein |
| 2009/0313132 | A1 | 12/2009 | McKenna et al. |
| 2010/0023343 | A1 | 1/2010 | Coleman et al. |
| 2010/0076853 | A1 | 3/2010 | Schwarz |
| 2013/0231993 | A1 | 9/2013 | Lam |

FOREIGN PATENT DOCUMENTS

| | | | |
|---|---|---|---|
| WO | 03067493 | A1 | 8/2003 |
| WO | 2006126996 | A1 | 11/2006 |

OTHER PUBLICATIONS

"Touchscreen Table Surfaces," Appliance Design, vol. 56, Issue 8, U.S., Aug. 2008.
Notification of Transmittal of the International Search Report and the Written Opinion of the International Searching Authority, PCT/US2011/037490, Apr. 6, 2012.

* cited by examiner

400

```
404 A signal bearing medium 402 at least one of one or more instructions for receiving an order for a food item
        submitted by the first touch screen device via a first network,
        wherein the order is associated with a first identification for a
        merchant, a second identification for the customer, and a
        negotiable parameter reflective of a preference of the customer;

one or more instructions for making available the order for a
        second touch screen device of the merchant to retrieve via a
        second network and to display; and/or one or more instructions, prior to completing processing of the
        order, for transmitting a first response to the preference of the
        customer to the first touch screen device via the first network,
        wherein the first response is submitted by the second touch
        screen device 406 a recordable medium          408 a non-transitory computer
                                      readable medium
```

FIG. 4

TWO-WAY TOUCH-SCREEN BASED COMMUNICATION SYSTEM

CROSS-REFERENCE TO RELATED APPLICATIONS

This application is a continuation of U.S. patent application Ser. No. 13/866,038 filed on Apr. 19, 2013, now U.S. Pat. No. 8,743,073 B2, which is a continuation of U.S. patent application Ser. No. 13/078,946 filed on Apr. 2, 2011, now U.S. Pat. No. 8,436,826 B2, which claims the benefit of the U.S. Provisional Application No. 61/320,527, filed on Apr. 2, 2010. The related applications are hereby incorporated by reference in their entirety.

BACKGROUND

Customers and merchants currently have, via the Internet, phone, and in-person, a variety of mechanisms for two-way communication that make it possible to facilitate business communications. However, current business communication mechanisms are deficient in accuracy, efficiency, convenience, and personalization when used as an ordering system. The convenience and practicality of current loyalty rewards systems, the efficiency and specificity of advertising opportunities for merchants, and the security and convenience of the current payments settlement system are also deficient. This is because traditional communications between customers and merchants have primarily been either direct, real-time in-person contacts or phone orders. Non-digital and non-targeted offline and online advertising are sub-optimal.

BRIEF DESCRIPTION OF THE DRAWINGS

FIG. 4 is a block diagram of an illustrative embodiment of a computer program product for implementing a process for managing the two-way communication between a first touch screen device of a customer and a second touch screen device of a merchant, all arranged in accordance with at least some embodiments of the present disclosure.

DETAILED DESCRIPTION

Figure 1:
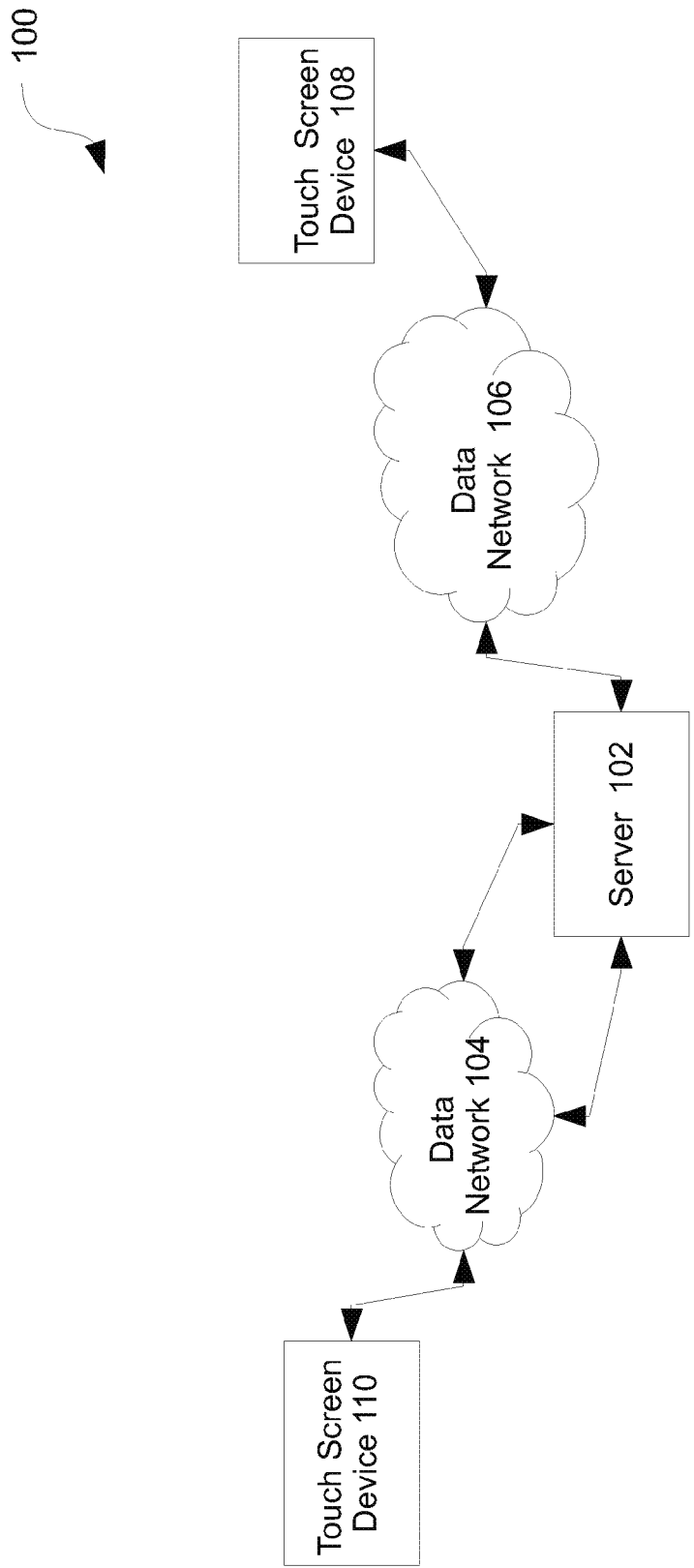
FIG. 1 is a block diagram of an example communication system 100 between a touch screen device 110 of a customer and a touch screen device 108 of a merchant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to two-way touch screen based communications. Throughout this disclosure, a "touch screen device" broadly refers to a general-purpose programmable device that supports a touch screen and receives at least some input data via the touch screen. Some examples of a touch screen device may include, without limitation, a tablet computing device, a smartphone, a laptop hybrid, and a touch screen laptop.

FIG. 1 is a block diagram of an example communication system 100 between a touch screen device 110 of a customer and a touch screen device 108 of a merchant, arranged in accordance with at least some embodiments of the present disclosure. The communication system 100 includes a server 102, a data network 104, and a data network 106. The touch screen device 110 is coupled to the server 102 via the data network 104, and the touch screen device 108 is coupled to the server 102 via the data network 106. In one example configuration, both of the data network 104 and the data network 106 may include one or more wireless networks, such as, without limitation, cellular networks, WiFi networks, Near Field Communication networks, Bluetooth networks, and others. Some portions of the data network 104 and the data network 106 may also include wired networks. In some implementations, the connection between the touch screen device 110 and the server 102 may be distinct from the connection between the touch screen device 108 and the server 102. For example, the touch screen device 110 may be connected to the server 102 via a cellular connection, and the touch screen device 108 may be connected to the server 102 via a WiFi connection.

Figure 2:
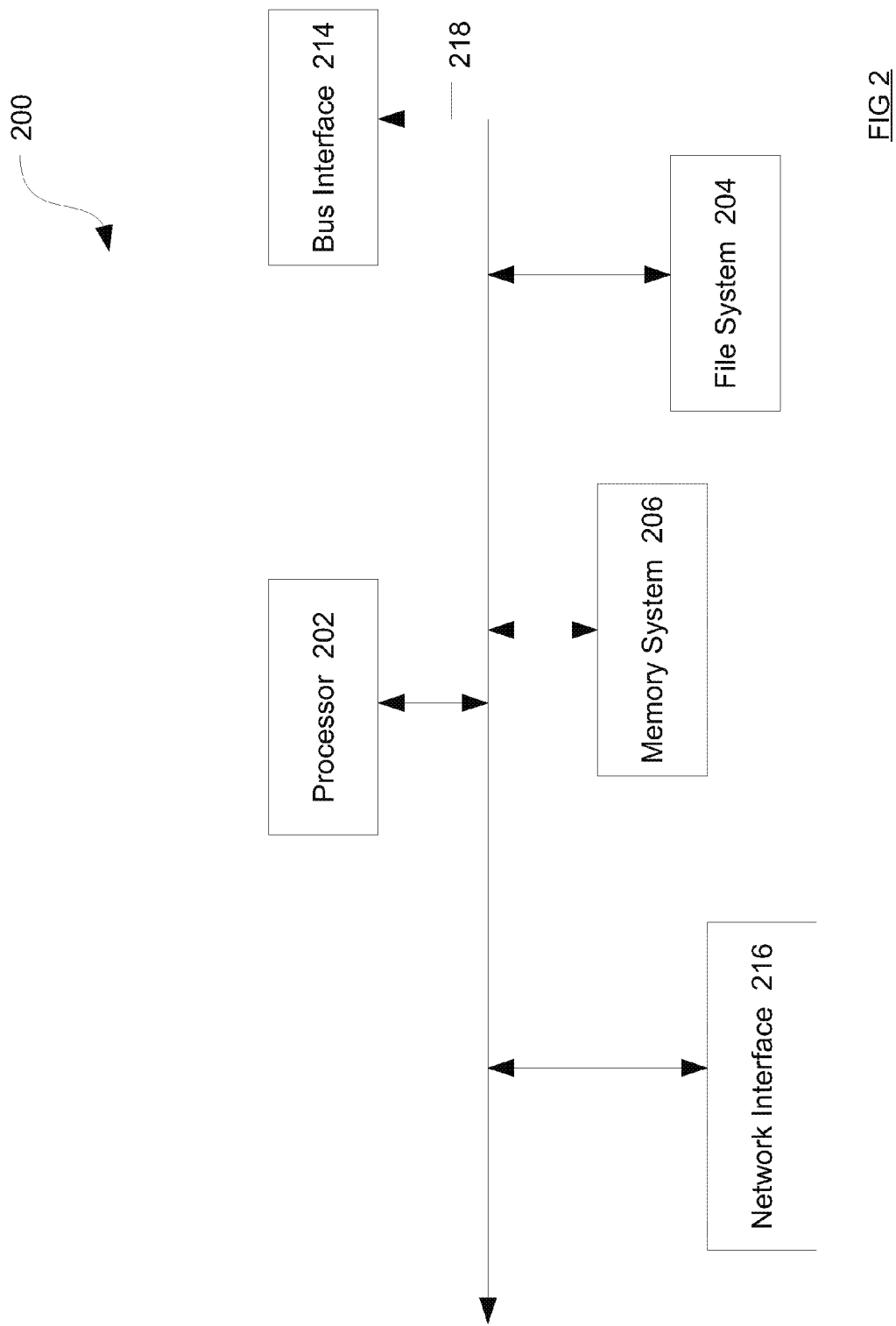
FIG. 2 illustrates a simplified configuration of a server, which is configured to support various functions of the communication system of FIG. 1.

FIG. 2 illustrates a simplified configuration of a server 200, which is configured to support various functions of the communication system 100 of FIG. 1, arranged in accordance with at least some embodiments of the present disclosure. The example server 200 may correspond to the server 102 illustrated in FIG. 1, and it may include, without limitation, a processor 202, a file system 204, a memory system 206, a bus interface 214, a network interface 216, and a data bus 218. The server 200 may also include a graphics system (not shown), a display device (not shown), and other input/output (I/O) interfaces (not shown.)

The processor 202 is generally configured to control the overall operation of the server 200. The file system 204 is generally configured to provide high capacity storage capability for the server 200. Some examples of the file system 204 may include, without limitation, one or more hard drives, flash memories, and/or solid state drives (SSD.) The memory system 206 may be configured to store programming instructions and/or data. Some examples of the memory system 206 may include, without limitation, a cache, Random-Access Memory (RAM), and/or Read-Only Memory (ROM.)

The data bus 218 may facilitate data transfer among at least the file system 204, the memory system 206, the network interface 216, and the processor 202. The bus interface 214 may allow the server 200 to couple to another device over a wired connection.

The network interface 216 may be configured to transmit and receive data over a wired network, a wireless network, and/or a combination of the two. Various networking standards may be supported, such as, without limitation, IEEE 802.11x standards, the Bluetooth standard, Near Field Communication standards, cellular wireless standards (e.g., Global System for Mobile communication (GSM), Code Division Multiple Access (CDMA), and Time Division Multiple Access (TDMA)), Ethernet, Fiber Channel fabric, and others.

Referring back to FIG. 1, in one example operation scenario, a first application may be executed on the touch screen device 110 of FIG. 1. The first application may provide a list of merchants for the customer to select from. This list may be generated based on the proximity of the merchants to the customer, the frequency of the customer's ordering at the merchants, a customer specified filter, and other factors. Once the touch screen device 110 receives a merchant selection, likely entered by the customer via the touch screen of the touch screen device 110, the first application may prompt the customer to place an order for a food item. If the customer is a returning customer for this selected merchant, then the first application may present previously-entered orders for the customer to consider. Any information relating to prior attempts to purchase or completed purchases made by the customer may be retained by the server 102 or the first application executing on the touch screen device 110. Otherwise, the first application may present the customer with options to enter a new order. The order may be transmitted through the wireless data network 104 to the server 102 and then to the touch screen device 108 via the wireless data network 106. Through this network, payment for the order may be made and processed, and loyalty rewards, if any, associated with the order may also be processed.

In some implementations, the first application may prompt the customer to log in, so that the server 102, after having authenticated the customer's identity, may retrieve history data (e.g., prior purchases and previously established customer profile) associated with the customer. The history data may be relied upon to generate recommendations.

In some implementations, each order may be associated with, without limitation, identification information for the selected merchant (e.g., alphanumeric identification, name, address, latitude and longitude, phone number, image, contact email address, authorized device(s), and others), identification information for the customer (e.g., alphanumeric identification, name, address, phone number, image, contact email address, authorized device(s), and others), and a number of parameters. Some example parameters may include the type of order (e.g., drive-through or walk-in), ordered food item (e.g., Mark's special sub), the quantity of the ordered food item (e.g., 3 Mark's special subs), the pricing related to the ordered food item (e.g., individual and/or total price), and the pick-up time for the ordered food item (e.g., picking up in 15 minutes or in 3 hours.) Some of the parameters may reflect the preferences of the customer (e.g., a preferred price, a preferred pick-up time, and others.) In addition, some of the parameters may be negotiable and thus may be adjusted. Additional examples and details will be described in subsequent paragraphs.

Figure 3:
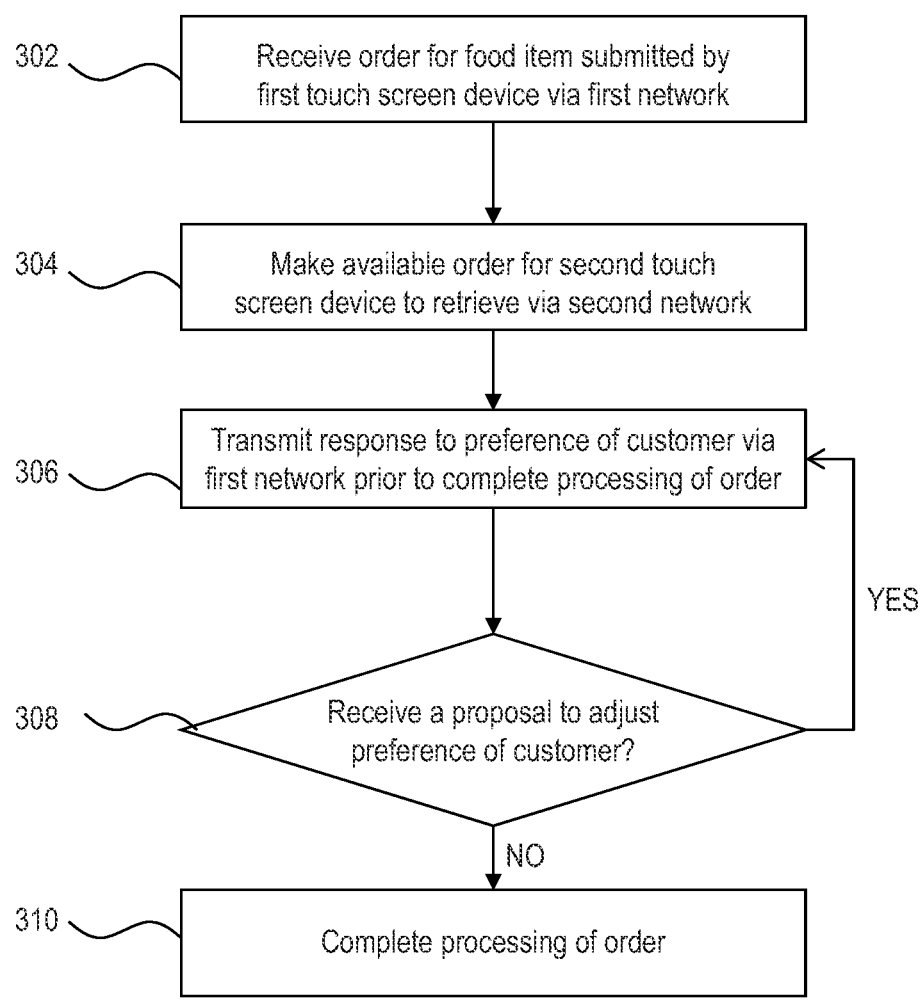
FIG. 3 is a flow chart illustrating an example process for managing the two-way communication between a first touch screen device of a customer and a second touch screen device of a merchant.

FIG. 3 is a flow chart illustrating an example process 300 for managing the two-way communication between a first touch screen device of a customer and a second touch screen device of a merchant, arranged in accordance with at least some embodiments of the present disclosure. The process 300 may include one or more functions, operations, or actions as depicted by operations 302, 304, 306, 308, and/or 310. In some implementations, the various features of the illustrated operations for the process 300 may be combined into fewer operations or divided into additional operations.

Processing for the process 300 may begin at operation 302, "receive order for food item placed by first touch screen device via first network." Operation 302 may be followed by operation 304, "make available order for second touch screen device to retrieve via second network." Operation 304 may be followed by operation 306, "transmit response to preference of customer via first network prior to complete processing of order." Operation 306 may be followed by operation 308, "receive a proposal to adjust preference of customer?" Operation 308 may be followed by either operation 306 when the decision logic tested at block 308 is satisfied (YES,) or operation 310, "complete processing of order," when the decision logic tested at block 308 is not satisfied (NO.)

In operation 302, a server, such as the server 102 of FIG. 1, may receive an order for a food item submitted by the first touch screen device of the customer, such as the touch screen device 110. As mentioned above, the order may include the identification information of the merchant, the identification of the customer, and some negotiable parameters. The server 102 may be configured to extract the identification information of the merchant from the order and identify the merchant based on the extracted information.

In operation 304, the server 102 may be configured to make the received order available for the second touch screen device of the selected merchant, such as the touch screen device 108 of FIG. 1, to retrieve. In some implementations, the server 102 may store the order in a queue associated with the extracted identification information, from which the touch screen device 108 may be configured to retrieve (or poll) from time to time. It should be noted that the server 102 may be configured to support multiple queues, one of which may be associated with the selected merchant.

In operation 306, after having retrieved the order, the touch screen device 108 may be configured to display the retrieved negotiable parameter, such as, without limitation, a pick-up time, a price, or others, that was submitted by the touch screen device 110. The negotiable parameter may contain a preference of the customer (e.g., a preferred time to pick up the ordered food item or a preferred price to pay for the ordered food item.) An application executed on the touch screen device 108 may prompt the merchant to respond to such a negotiable parameter before the order is processed any further. To illustrate, suppose the customer's preferred pick-up time is 12:30 PM. In addition to displaying the preferred 12:30 PM pick-up time, the touch screen device 108 may also display a dial to adjust the time with, an accept button to accept the time, and/or a reject button to reject the time. The merchant may use the displayed dial to adjust the time to 12:45 PM and then hit the accept button. Alternatively, the merchant may hit the accept button or the reject button without adjusting the time. The action of the merchant may be converted to a response, which is then transmitted back the server 102 via the data network 106. The server 102 then transmits the response to the touch screen device 110 of the customer via the data network 104.

In some implementations, the server 102 may be configured to transmit the history data associated with the customer to the touch screen device 108 to help the merchant determine a response to the customer's preference. For example, the customer may be a loyal customer of the merchant and thus has earned significant loyalty points issued by the merchant in the past. Such information may be displayed on the touch screen device 108, and the merchant may decide to accept the customer's preferred pick-up time without making any adjustment. Alternatively, based on the history data associated with the customer, the server 102 may instead be configured to generate a suggested response by highlighting one or more the aforementioned dial, accept button, or reject button displayed on the touch screen device 108. For example, the customer may have a history of not paying for his/her orders and making unreasonable demands, the server 102 may then be configured to suggest rejecting the order by causing the displayed reject button to be highlighted.

In some implementations, to encourage the customer to consider the merchant's response, the merchant may include in the response incentives, such as a price discount or additional loyalty program rewards. For example, in addition to the adjusted 12:45 PM pick-up time, the response may also include giving the customer a price discount for the ordered food item or awarding the customer additional loyalty points if the delayed pick-up time is accepted by the customer.

In operation 308, the server 102 may be configured to check whether it has received a proposal submitted by the touch screen device 110 to adjust the initially preference of the customer. Continuing with the earlier example, suppose the touch screen device 110 displays the adjusted 12:45 PM for the customer. An application executed on the touch screen device 110 may prompt the customer to modify, accept, or reject the merchant's suggested pick-up time. If the customer simply accepts or rejects, then the process 300 proceeds to operation 310. Otherwise, the adjusted customer preference (e.g., 12:55 PM) may be submitted by the touch screen device 110 to the server 102 via the 104, and the server 102 may then be configured to transmit the adjusted customer preference to the touch screen device 108 of the merchant via the data network 106, so that the adjusted customer preference may be displayed and considered by the merchant.

In operation 310, the server 102 may be configured to complete processing of the order. Some example tasks performed here may include, without limitation, ensuring payment from the customer has been authorized, removing the order from the queue, modifying loyalty information associated with the order (e.g., redeeming loyalty points, crediting additional loyalty points, etc.), and others.

FIG. 4 is a block diagram of an illustrative embodiment of a computer program product 400 for implementing a process for managing the two-way communication between a first touch screen device of a customer and a second touch screen device of a merchant, arranged in accordance with at least some embodiments of the present disclosure. The computer program product 400 may include a signal bearing medium 404. The signal bearing medium 404 may include one or more sets of executable instructions 402 that, when executed by, for example, a processor, may provide the functionality described above with respect to FIG. 3. Thus, for example, referring to the server 200 of FIG. 2, the processor 202 of the server 200 may undertake one or more of the operations shown in FIG. 3 in response to the instructions 402 conveyed to the server 200 by the signal bearing medium 404.

In some implementations, the signal bearing medium 404 may encompass a non-transitory computer readable medium 408, such as, but not limited to, a hard disk drive, a Compact Disc (CD), a Digital Video Disk (DVD), a digital tape, memory, etc. In some implementations, the signal bearing medium 404 may encompass a recordable medium 406, such as, but not limited to, memory, read/write (R/W) CDs, R/W DVDs, etc. The computer program product 400 may be recorded on the non-transitory computer readable medium 408 or another similar recordable medium 406.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

I claim:

1. A method to communicate with a first touch screen device of a customer, comprising:
    receiving an order for an item submitted by the first touch screen device via a first network, wherein the order is associated with a first identification for a merchant, a second identification for the customer, and a parameter reflective of a preference of the customer;
    making available the order for a second touch screen device of the merchant to retrieve via a second network and to display; and
    prior to completing processing of the order, transmitting a first response to the preference of the customer to the first touch screen device via the first network.

2. The method of claim 1, wherein the parameter is associated with at least one of time, a price, a location, and a special instruction.

3. The method of claim 1, further comprising:
    prior to transmitting the first response, transmitting history data associated with the customer to the second touch screen device via the second network.

4. The method of claim 3, further comprising transmitting the history data associated with the customer to the first touch screen device to be displayed.

5. The method of claim 3, wherein the history data associated with the customer includes at least one of information relating to prior purchases of the customer, profile information associated with the customer, and loyalty information associated with the customer.

6. The method of claim 5, wherein the profile information includes at least one of identification information of the customer and a photograph of the customer.

7. The method of claim 5, further comprising transmitting advertisements to the first touch screen device based on at least one of the order and the history data associated with the customer.

8. The method of claim 1, further comprising modifying loyalty information associated with the customer as a part of completing processing of the order.

9. The method of claim 8, further comprising:
    making available the loyalty information for the second touch screen device of the merchant to retrieve, display, and respond to.

10. The method of claim 1, wherein the first response includes incentives for the customer.

11. The method of claim 10, wherein the incentives are based on the loyalty information associated with the customer.

12. The method of claim 1, further comprising:
    prior to transmitting the first response, generating a suggested response based on first history data associated with the customer and transmitting the suggested response to the second touch screen device via the second network.

13. The method of claim 12, wherein the generating of the suggested response is further based on second history data associated with other customers, wherein the first history data and the second history data reflect a similar pattern.

14. The method of claim 12, wherein the generating of the suggested response further comprises prioritizing processing of the order.

15. The method of claim 12, wherein the suggested response includes a recommendation associated with the order.

16. The method of claim 1, wherein the first response is a confirmation of the merchant's acceptance of the preference of the customer.

17. The method of claim 1, wherein the first response is a proposal to modify the preference of the customer.

18. The method of claim 17, further comprising:
    receiving the parameter associated with the order, wherein the parameter is reflective of a modified preference of the customer;

making available the modified preference of the customer for the second touch screen device to retrieve via the second network and to display; and prior to completing processing of the order, transmitting a second response to the modified preference of the customer to the first touch screen device via the first network.

19. The method of claim 17, wherein the proposal to modify the preference of the customer is based on a condition associated with the merchant.

20. The method of claim 1, further comprising:
verifying payment associated with the order has been approved or authorized as a part of completing processing of the order.

21. A method for a second touch screen device of a merchant to communicate with a first touch screen device of a customer, comprising:
receiving an order for an item submitted by the first touch screen device via a network, wherein the order is associated with a first identification for the merchant, a second identification for the customer, and a parameter reflective of a preference of the customer;
displaying information associated with the order on the second touch screen device; and
prior to completing processing of the order, initiating a transmission of a first response to the preference of the customer to the first touch screen device via the network.

22. The method of claim 21, wherein the parameter is associated with at least one of time, a price, a location, and a special instruction.

23. The method of claim 21, further comprising:
prior to initiating the transmission of the first response, retrieving history data associated with the customer.

24. The method of claim 23, wherein the history data associated with the customer includes at least one of information relating to prior purchases of the customer, profile information associated with the customer, and loyalty information associated with the customer.

25. The method of claim 24, wherein the profile information includes at least one of identification information of the customer and a photograph of the customer.

26. The method of claim 24, further comprising initiating a transmission of advertisements to the first touch screen device based on at least one of the order and the history data associated with the customer.

27. The method of claim 21, further comprising tracking and responding to loyalty information associated with the customer.

28. The method of claim 21, wherein the first response includes incentives for the customer.

29. The method of claim 28, wherein the incentives are based on the loyalty information associated with the customer.

30. The method of claim 21, further comprising generating a suggested response based on first history data associated with the customer.

31. The method of claim 30, wherein the generating of the suggested response is further based on second history data associated with other customers, wherein the first history data and the second history data reflect a similar pattern.

32. The method of claim 30, wherein the generating of the suggested response further comprises prioritizing processing of the order.

33. The method of claim 30, wherein the suggested response includes a recommendation associated with the order.

34. The method of claim 21, wherein the first response is a confirmation of the merchant's acceptance of the preference of the customer.

35. The method of claim 21, wherein the first response is a proposal to modify the preference of the customer.

36. The method of claim 35, further comprising:
receiving the parameter associated with the order, wherein the parameter is reflective of a modified preference of the customer;
displaying the modified preference of the customer; and
prior to completing processing of the order, initiating a transmission of a second response to the modified preference of the customer to the first touch screen device via the network.

37. The method of claim 35, wherein the proposal to modify the preference of the customer is based on a condition associated with the merchant.

38. The method of claim 21, further comprising verifying payment associated with the order has been approved or authorized as a part of completing processing of the order.

39. A method to communicate with a first touch screen device of a customer, comprising:
transmitting information associated with a plurality of merchants to the first touch screen device to be displayed, wherein the plurality of merchants are in close proximity to the first touch screen device;
receiving an order for an item submitted by the first touch screen device via a first network, wherein the order is associated with a first identification for a merchant selected from the plurality of merchants, a second identification for the customer, and a parameter reflective of a preference of the customer;
receiving a first response of the merchant to the preference of the customer after a second touch screen device of the merchant retrieves via a second network and displays the order and history data associated with the customer; and
prior to completing processing of the order, transmitting the first response to the preference of the customer to the first touch screen device via the first network.

40. A method for a second touch screen device of a merchant to communicate with a first touch screen device of a customer, comprising:
receiving an order for an item submitted by the first touch screen device via a network, wherein the order is associated with a first identification for the merchant, a second identification for the customer, and a parameter reflective of a preference of the customer;
displaying information associated with the order, history data associated with the customer, and options to generate a first response to the preference of the customer on the second touch screen device;
prior to completing processing of the order, initiating a transmission of the first response to the preference of the customer to the first touch screen device via the network; and
displaying options on the second touch screen device for the merchant to modify status of the order.

41. A method to communicate with a first touch screen device of a customer, comprising:
transmitting information associated with a plurality of merchants to the first touch screen device to be displayed, wherein the plurality of merchants are in close proximity to the first touch screen device;
receiving an order for an item submitted by the first touch screen device via a first network, wherein the order is associated with a first identification for a merchant selected from the plurality of merchants, a second identification for the customer, and a parameter reflective of a preference of the customer;

receiving a first response of the merchant to the preference of the customer after a second touch screen device of the merchant retrieves via a second network and displays the order and history data associated with the customer;

transmitting status of the order to the first touch screen device via the first network to be displayed; and prior to completing processing of the order, transmitting the first response to the preference of the customer to the first touch screen device via the first network.

42. An apparatus, comprising:
a processor;
a file system;
a network interface coupled to a first network and a second network; and
a memory system including a set of executable instructions for a method to communicate with a first touch screen device of a customer, which in response to execution by the processor, cause the processor to
receive an order for an item submitted by the first touch screen device via the first network, wherein the order is associated with a first identification for a merchant, a second identification for the customer, and a parameter reflective of a preference of the customer;
make available the order for a second touch screen device of the merchant to retrieve via the second network and to display; and
prior to completing processing of the order, transmit a first response to the preference of the customer to the first touch screen device via the first network.

43. The apparatus of claim 42, wherein the parameter is associated with at least one of time, a price, a location, and a special instruction.

44. The apparatus of claim 42, wherein the processor is further configured to, prior to transmitting the first response, retrieve history data associated with the customer from the file system and transmit the history data to the second touch screen device via the second network.

45. The apparatus of claim 44, wherein the processor is further configured to transmit the history data associated with the customer to the first touch screen device to be displayed.

46. The apparatus of claim 44, wherein the history data associated with the customer includes at least one of information relating to prior purchases of the customer, profile information associated with the customer, and loyalty information associated with the customer.

47. The apparatus of claim 46, wherein the profile information includes at least one of identification information of the customer and a photograph of the customer.

48. The apparatus of claim 46, wherein the processor is further configured to transmit advertisements to the first touch screen device based on at least one of the order and the history data associated with the customer.

49. The apparatus of claim 42, wherein the processor is further configured to modify loyalty information associated with the customer and store the modified loyalty information in the file system as a part of completing processing of the order.

50. The apparatus of claim 49, wherein the processor is further configured to make available the loyalty information for the second touch screen device of the merchant to retrieve, display, and respond to.

51. The apparatus of claim 42, wherein the first response includes incentives for the customer.

52. The apparatus of claim 51, wherein the incentives are based on the loyalty information associated with the customer.

53. The apparatus of claim 42, wherein the processor is further configured to prior to transmitting the first response, generate a suggested response based on first history data associated with the customer and transmitting the suggested response to the second touch screen device via the second network.

54. The apparatus of claim 53, wherein the generating of the suggested response is further based on second history data associated with other customers, wherein the first history data and the second history data reflect a similar pattern.

55. The apparatus of claim 53, wherein the generating of the suggested response further comprises prioritizing processing of the order.

56. The apparatus of claim 53, wherein the suggested response includes a recommendation associated with the order.

57. The apparatus of claim 42, wherein the first response is a confirmation of the merchant's acceptance of the preference of the customer.

58. The apparatus of claim 42, wherein the first response is a proposal to modify the preference of the customer.

59. The apparatus of claim 58, wherein the proposal to modify the preference of the customer is based on a condition associated with the merchant.

60. The apparatus of claim 58, wherein the processor is further configured to:
receive the parameter associated with the order, wherein the parameter is reflective of a modified preference of the customer;
make available the modified preference of the customer for the second touch screen device to retrieve via the second network and to display; and
prior to completing processing of the order, transmit a second response to the modified preference of the customer to the first touch screen device via the first network.

61. The apparatus of claim 42, wherein the processor is further configured to verify payment associated with the order has been approved or authorized as a part of completing processing of the order.

62. An apparatus of a merchant, comprising:
a processor;
a second touch screen device;
a file system;
a network interface coupled to a network; and
a memory system including a set of executable instructions for a method to communicate with a first touch screen device of a customer, which in response to execution by the processor, cause the processor to
receive an order for an item submitted by the first touch screen device via the network, wherein the order is associated with a first identification for the merchant, a second identification for the customer, and a parameter reflective of a preference of the customer;
display information associated with the order on the second touch screen device; and
prior to completing processing of the order, initiate a transmission of a first response to the preference of the customer to the first touch screen device via the network.

63. The apparatus of claim 62, wherein the parameter is associated with at least one of time, a price, a location, and a special instruction.

64. The apparatus of claim 62, wherein the processor is further configured to prior to initiating the transmission of the first response, retrieve history data associated with the customer from the file system.

65. The apparatus of claim 64, wherein the history data associated with the customer includes at least one of information relating to prior purchases of the customer, profile information associated with the customer, and loyalty information associated with the customer.

66. The apparatus of claim 65, wherein the profile information includes at least one of identification information of the customer and a photograph of the customer.

67. The apparatus of claim 65, wherein the processor is further configured to initiate a transmission of advertisements to the first touch screen device based on at least one of the order and the history data associated with the customer.

68. The apparatus of claim 62, wherein the processor is further configured to track and respond to loyalty information associated with the customer.

69. The apparatus of claim 62, wherein the first response includes incentives for the customer.

70. The apparatus of claim 69, wherein the incentives are based on the loyalty information associated with the customer.

71. The apparatus of claim 62, wherein the processor is further configured to generate a suggested response based on first history data associated with the customer.

72. The apparatus of claim 71, wherein the generating of the suggested response is further based on second history data associated with other customers, wherein the first history data and the second history data reflect a similar pattern.

73. The apparatus of claim 71, wherein the generating of the suggested response further comprises prioritizing processing of the order.

74. The apparatus of claim 71, wherein the suggested response includes a recommendation associated with the order.

75. The apparatus of claim 62, wherein the first response is a confirmation of the merchant's acceptance of the preference of the customer.

76. The apparatus of claim 62, wherein the first response is a proposal to modify the preference of the customer.

77. The apparatus of claim 76, wherein the proposal to modify the preference of the customer is based on a condition associated with the merchant.

78. The apparatus of claim 76, wherein the processor is further configured to:
receive the parameter associated with the order, wherein the parameter is reflective of a modified preference of the customer;
display the modified preference of the customer on the second touch screen device; and
prior to completing processing of the order, initiating a transmission of a second response to the modified preference of the customer to the first touch screen device via the network.

79. The apparatus of claim 62, wherein the processor is further configured to verify payment associated with the order has been approved or authorized as a part of completing processing of the order.

80. An apparatus, comprising:
a processor;
a network interface coupled to a first network and a second network; and
a memory system including a set of executable instructions for a method to communicate with a first touch screen device of a customer, which in response to execution by the processor, cause the processor to
transmit information associated with a plurality of merchants to the first touch screen device to be displayed, wherein the plurality of merchants are in close proximity to the first touch screen device;
receive an order for an item submitted by the first touch screen device via the first network, wherein the order is associated with a first identification for a merchant selected from the plurality of merchants, a second identification for the customer, and a parameter reflective of a preference of the customer;
receive a first response of the merchant to the preference of the customer after a second touch screen device of the merchant retrieves via the second network and displays the order and history data associated with the customer; and
prior to completing processing of the order, transmit the first response to the preference of the customer to the first touch screen device via the first network.

81. An apparatus of a merchant, comprising:
a processor;
a second touch screen device;
a network interface coupled to a network; and
a memory system including a set of executable instructions for a method to communicate with a first touch screen device of a customer, which in response to execution by the processor, cause the processor to
receive an order for an item submitted by the first touch screen device via the network, wherein the order is associated with a first identification for the merchant, a second identification for the customer, and a parameter reflective of a preference of the customer;
display information associated with the order, history data associated with the customer, and options to generate a first response to the preference of the customer on the second touch screen device;
prior to completing processing of the order, initiate a transmission of the first response to the preference of the customer to the first touch screen device via the network; and
display options on the second touch screen device for the merchant to modify status of the order.

82. An apparatus, comprising:
a processor;
a network interface coupled to a first network and a second network; and
a memory system including a set of executable instructions for a method to communicate with a first touch screen device of a customer, which in response to execution by the processor, cause the processor to
transmit information associated with a plurality of merchants to the first touch screen device to be displayed, wherein the plurality of merchants are in close proximity to the first touch screen device;
receive an order for an item submitted by the first touch screen device via the first network, wherein the order is associated with a first identification for a merchant selected from the plurality of merchants, a second identification for the customer, and a parameter reflective of a preference of the customer;
receive a first response of the merchant to the preference of the customer after a second touch screen device of the merchant retrieves via the second network and displays the order and history data associated with the customer;
transmit status of the order to the first touch screen device via the first network to be displayed; and
prior to completing processing of the order, transmitting the first response to the preference of the customer to the first touch screen device via the first network.

* * * * *